Figure 1:
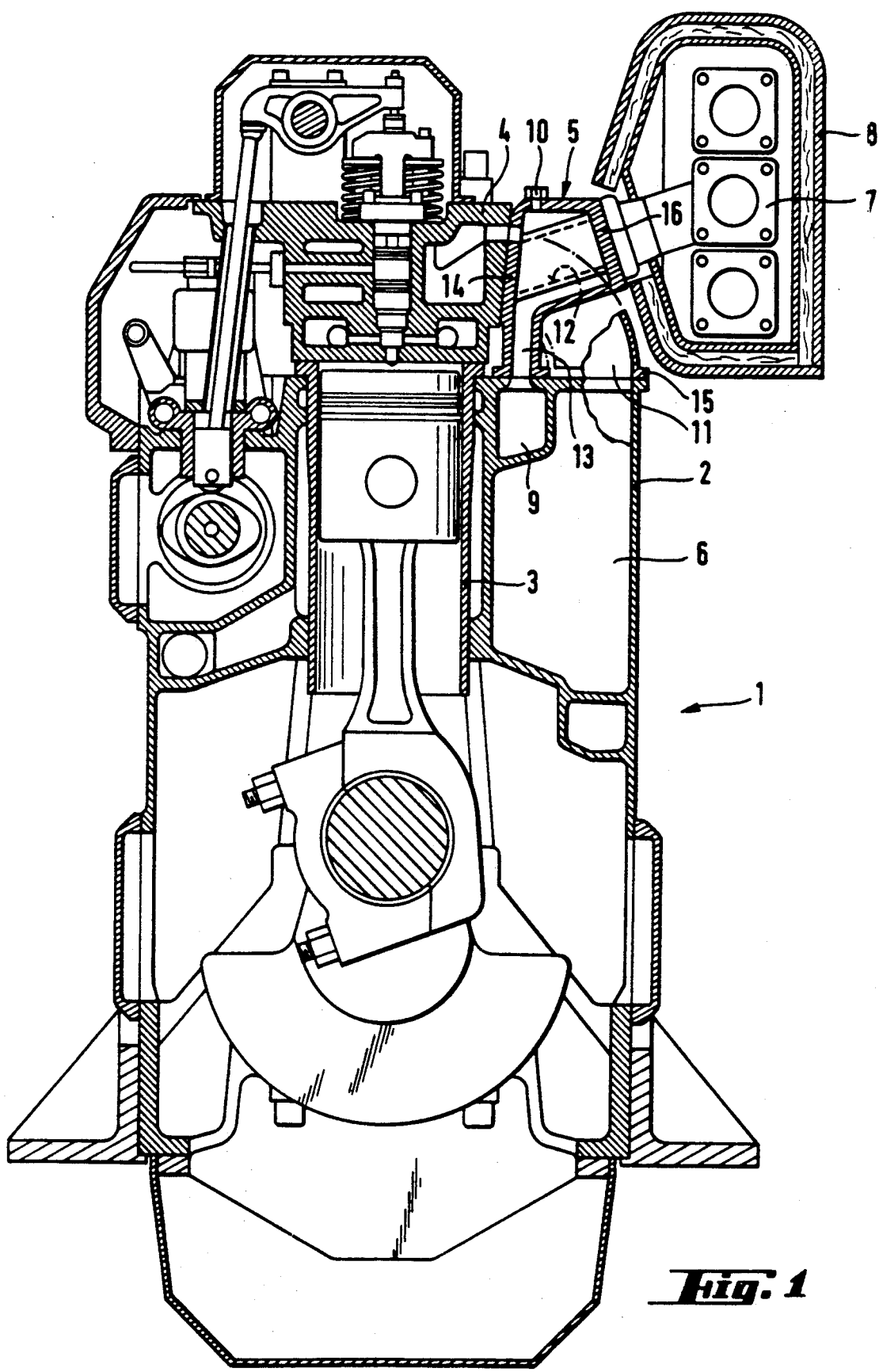

United States Patent [19]

Stenfors et al.

[11] Patent Number: 5,213,068

[45] Date of Patent: May 25, 1993

[54] ARRANGEMENT FOR CONNECTING PRESSURE MEDIUM SYSTEMS TO CYLINDER HEAD IN BIG DIESEL ENGINES

[75] Inventors: Hugo Stenfors, Västerhankmo; Arto Nikula, Merikaarto, both of Finland

[73] Assignee: Wartsila Diesel International Ltd. Oy, Helsinki, Finland

[21] Appl. No.: 967,254

[22] Filed: Oct. 26, 1992

[30] Foreign Application Priority Data

Nov. 11, 1991 [FI] Finland ............................ 915297

[51] Int. Cl.$^5$ ............................................ F02M 35/10
[52] U.S. Cl. ........................ 123/52 MC; 123/41.82 R
[58] Field of Search ........ 123/52 M, 52 MV, 52 MC, 123/41.31, 41.72, 41.82 R

[56] References Cited

U.S. PATENT DOCUMENTS

| | | | |
|---|---|---|---|
| 4,187,678 | 2/1980 | Herenius | 60/321 |
| 4,589,381 | 5/1986 | Takayama | 123/52 M |
| 4,684,351 | 8/1987 | Watanabe et al. | 123/41.82 R |
| 4,686,944 | 8/1987 | Hiraoka et al. | 123/52 MC |
| 4,884,534 | 12/1989 | Moore | 123/52 M |

FOREIGN PATENT DOCUMENTS

| | | | |
|---|---|---|---|
| 3641812 | 2/1988 | Fed. Rep. of Germany | 123/52 M |
| 0142412 | 11/1979 | Japan | 123/41.82 R |
| 0027867 | 2/1983 | Japan | 123/52 M |
| 0098123 | 6/1985 | Japan | 123/52 M |
| 0064617 | 3/1991 | Japan | 123/52 M |
| 0160112 | 7/1991 | Japan | 123/52 M |

Primary Examiner—David A. Okonsky
Attorney, Agent, or Firm—Dellett, Smith-Hill and Bedell

[57] ABSTRACT

The invention relates to a connection arrangement for pressure medium systems in a big diesel engine including a number of cylinders (3), wherein different pressure mediums provided for a cylinder (3) are transported through respective passages in a cylinder head (4). The connection ports for the pressure medium systems for a cylinder (3) are positioned in the cylinder head (4) on the same side of an engine block (2). The arrangement comprises further a separate distribution piece (5) for each of the cylinders (3) installed on the cylinder head (4) at the position of said connection ports, said distribution piece (5) including a first flow-through channel (11) for leading combustion air from an air supplying system through the cylinder head (4) into the cylinder (3), a second flow-through channel (12) for leading exhaust gases through the cylinder head (4) into an exhaust pipe (7) and a third flow-through channel (13) for leading cooling water provided for the cylinder (3) through the cylinder head (4) for the recovery thereof. The flow-through channels (11,12,13) are arranged substantially in transverse direction relative to the engine block (2). In addition the distribution piece (5) includes flange-like attachment members (14,15), which are placed on adjoining sides in the distribution piece (5) for fixing it on the one hand to the cylinder head (4) and on the other hand to the engine block (2).

9 Claims, 2 Drawing Sheets

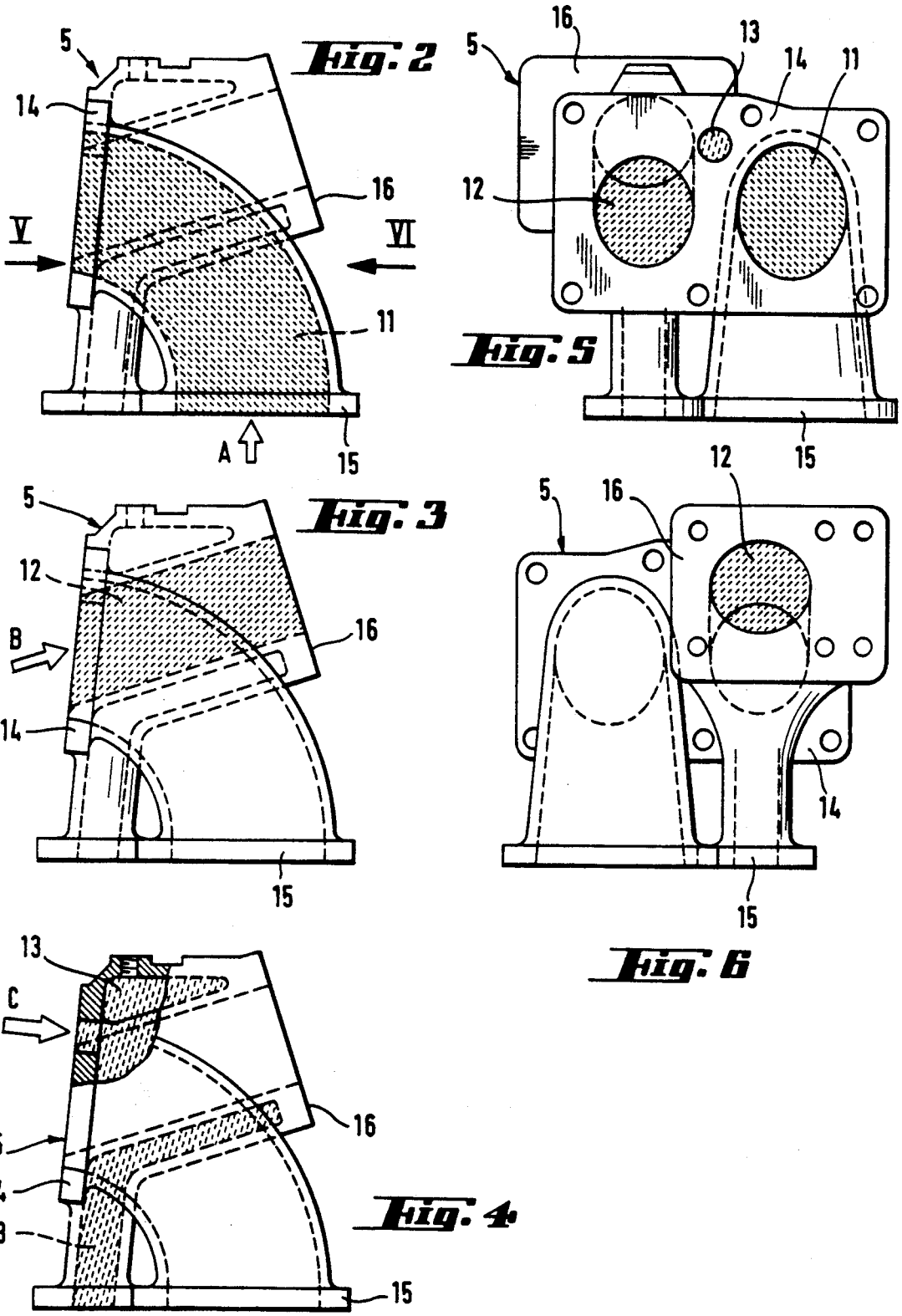

ARRANGEMENT FOR CONNECTING PRESSURE MEDIUM SYSTEMS TO CYLINDER HEAD IN BIG DIESEL ENGINES

The invention relates to an arrangement for connection of different pressure medium systems to the cylinder head in big diesel engines in accordance with the preamble of claim 1.

In this context a big diesel engine is taken to mean the sort of engine used in ships as the main or auxiliary engine, or in diesel power stations. The engines are usually pressure charged and they are also often provided with a separate cylinder head for each cylinder. In diesel engines like this there is a need to transport many different pressure mediums through the cylinder head, whereby transportation of pressure mediums into and out from the cylinder head is arranged through many different pipe systems and parts. For example combustion air is usually led from the turbocharger to a special container, which can be a separate one or in-built into the engine block and from which it is led further with pipe members through the cylinder head into each cylinder.

The exhaust gases leave the cylinder through the cylinder head and through different pipe members into the exhaust manifold of the engine, which in most cases is thermally isolated within a separate casing. Supporting of the exhaust pipe and of the thermal isolation unit is arranged with separate support consols fastened to the engine block.

Cooling water for the cylinders is also used for cooling of the cylinder heads, whereby the cooling water is recovered with a pipe manifold connected to the cylinder head.

The above described known pressure medium systems have resulted in complicated solutions with many separate parts to be separately fastened, whereby the manufacturing costs are high and the installation is laborious and time consuming.

An object of the invention is to accomplish a new, improved solution for connection of different pressure medium systems to the cylinder head, from which the drawbacks apparent in the above described known arrangements have essentially been eliminated. An object is more specifically to create an arrangement with an uncomplicated construction and advantageous from the viewpoint of manufacturing technique, and the installation of which saves time and costs. A further object is integration of the arrangement to the cylinder head so that it can provide a firm basis for supporting also other engine parts.

The objects of the invention are achieved in the manner set out in claim 1 and in the subclaims. According to the invention connection ports for the pressure medium systems for a cylinder are positioned in the cylinder head on the same side of an engine block. The arrangement comprises a separate distribution piece for each of the cylinders installed on the cylinder head at the position of said connection ports, said distribution piece including a first flow-through channel for leading combustion air from an air supplying system through the cylinder head into the cylinder, a second flow-through channel for leading exhaust gases through the cylinder head into an exhaust pipe and a third flow-through channel for leading cooling water provided for the cylinder through the cylinder head for the recovery thereof. In addition said flow-through channels are arranged substantially in transverse direction relative to the engine block, and the distribution piece includes flange-like attachment members, which are placed on adjoining sides in the distribution piece for fixing it on the one hand to the cylinder head and on the other hand to the engine block.

A distribution piece according to the invention constitutes with advantage a single piece of casting.

From the viewpoint of construction and manufacturing technique it is of advantage to arrange the connection ports in the distribution piece connectable to the cylinder head at least substantially in the same uniform plane. From the viewpoint of space requirements it is of advantage to arrange the combustion air channel and the exhaust gas channel in the distribution piece adjacent to each other in the longitudinal direction of the engine.

The exhaust gas channel of the distribution piece is with advantage arranged so that its inlet and outlet are located on opposite sides of the distribution piece. By providing the outlet for the exhaust gas channel of the distribution piece with a flange or the like the exhaust pipe, and an isolating casing possibly attached thereto, can be supported to the engine block through the distribution piece.

When the invention is applied to a big charged diesel engine, in which the engine block includes in a known way an in-built or to the engine block separately fastened collecting container for charged combustion air, the combustion air channel of the distribution piece can be arranged to lead combustion air from the said collecting container into the cylinder head.

Correspondingly, in case the engine block includes a collecting channel or the like for collecting cooling water, used in a known way for cooling of a cylinder, through the cylinder head further to be recovered, the cooling water channel of the distribution piece is with advantage located at least partly around the exhaust gas channel and its outlet is connected to the said collecting channel or the like for cooling water located in the engine block. Thus a space saving uniform construction is obtained for the distribution piece and at the same time the solution also forwards cooling of the exhaust gas channel and the whole engine block.

In the following the invention is described in more detail with reference to the accompanying drawings, in which FIG. 1 shows a cross-sectional view of a diesel engine, in which an arrangement according to the invention for the connection of different pressure medium systems to the cylinder head is applied, FIGS. 2, 3 and 4 show a side view of a distribution piece according to the invention, whereby different pressure medium channels are illustrated in different figures with stripes, FIG. 5 shows the distribution piece of FIGS. 2..4 seen from the direction of arrow V, FIG. 6 shows the distribution piece of FIGS. 2..4 seen from the direction of arrow VI.

In the drawings numeral 1 indicates a big diesel engine to which the invention is directed. In accordance with FIG. 1 the engine includes an engine block 2, a cylinder 3 and a cylinder head 4. Conventionally there can be a plurality of cylinders in the engine arranged adjacent to each other in a row or so as to form a V-engine and each of the cylinders can with advantage be provided with a separate cylinder head of their own. The engine also includes an exhaust manifold 7, which is, in the case of FIG. 1, surrounded by an isolating casing 8. Furthermore the engine includes a collecting container 6, arranged in the engine block 2, for combustion air fed by a not-shown turbocharger and a collecting channel 9 for the cooling water or other suitable cooling substance used for the cooling of the cylinder 3. In addition, each cylinder 3 in the engine is provided with a distribution piece 5 for different pressure mediums, the construction and the function of which as part of the arrangement according to the invention will be described in more detail in the following. The other parts of the engine shown in FIG. 1 forming no part of the present invention are not described here.

The distribution piece 5 constitutes a single piece, which is with advantage manufactured through casting. The distribution piece 5 includes a combustion air channel 11, which leads the combustion air from the collecting container 6 in the engine block 2 through the cylinder head 4 further into the cylinder 3. The combustion air channel 11 is striped in FIG. 2 and the direction of flow is shown with arrow A.

The distribution piece 5 includes also an exhaust gas channel 12, which leads the exhaust gases from the cylinder 3 through the cylinder head 4 into the exhaust pipe 7 of the cylinder in question. The exhaust gas channel 12 is striped in FIG. 3 and the direction of flow is shown with arrow B.

In addition the distribution piece 5 includes a cooling water channel 13, which leads the cooling water used for cooling of the cylinder 3 through the cylinder head 4 further into the collecting channel 9 for the cooling water located in the engine block 2 for recovery and recycling. The cooling water channel 13 is striped in FIG. 4 and the direction of flow is shown with arrow C.

The distribution piece 5 is provided with flange-like attachment members 14 and 15, by means of which it is attached on the one hand to the cylinder head 4 and on the other hand to the engine block 2. As the distribution piece 5 thus forms a rigid and compact part of the engine, in accordance with the invention it is additionally arranged to support the exhaust manifold 7 and its isolating casing 8 by means of the flange member 16. Hence, no separate supporting consol to be fastened to the engine block is needed anymore for this purpose, as is the case with conventional engines.

As the combustion air channel 11 and the exhaust gas channel 12 are the largest ones of the channels in the distribution piece 5, in accordance with the embodiment shown in the figures they are positioned adjacent to each other in the longitudinal direction of the engine as shown in FIG. 5. From the viewpoint of construction and manufacturing technique it is of advantage that the connection ports arranged in the flange member 14 of the distribution piece 5 are placed on the same plane against the cylinder head 4. Although not shown more specifically in the figures, it will be understood that the end surface of the cylinder head 4 naturally corresponds to the flange member 14.

In the embodiment shown in the figures the cooling water channel 13 is located around the exhaust gas channel 12, whereby a space saving and advantageous solution from the viewpoint of the cooling of the distribution piece is achieved.

Generally the form and location of the channels can be changed according to need. This is especially true with engine versions, where the collecting container for combustion air or the collecting channel for the cooling water has not been connected to be part of the engine block itself. The invention can further be adapted also to non-charged engines. An essential thing is that there is a separate distribution piece 5 provided, which is connectable to the cylinder head 4 and by means of which pressure medium flows to be lead through the cylinder head 4 can with advantage be controlled and thus a number of separate connection pipes be eliminated. At the same time the distribution piece can with advantage serve for its part as a supporting basis for fastening of other parts as described above. All this makes not only the construction of the engine more simple but also the production of the parts as well as the required measures for installation and service.

FIG. 1 shows as a way of example also a bleed screw 10 in connection with the cooling water channel 13. This shows for its part that the distribution piece 5 according to the invention can with advantage be used also for controlling and for regulating purposes of the pressure medium flows flowing through it.

The invention is not limited to the embodiments shown, but several modifications thereof are feasible within the scope of the attached claims.

We claim:

1. Connection arrangement for pressure medium systems in a big diesel engine including a number of cylinders (3), wherein different pressure mediums provided for a cylinder (3) are transported through respective passages in a cylinder head (4), the arrangement being such that connection ports for the pressure medium systems for a cylinder (3) are positioned in the cylinder head (4) on the same side of an engine block (2), that the arrangement comprises a separate distribution piece (5) for each of the cylinders (3) installed on the cylinder head (4) at the position of said connection ports, said distribution piece (5) including a first flow-through channel (11) for leading combustion air from an air supplying system through the cylinder head (4) into the cylinder (3), a second flow-through channel (12) for leading exhaust gases through the cylinder head (4) into an exhaust pipe (7) and a third flow-through channel (13) for leading cooling water provided for the cylinder (3) through the cylinder head (4) for the recovery thereof, that said flow-through channels (11,12,13) are arranged substantially in transverse direction relative to the engine block (2), and that the distribution piece (5) includes flange-like attachment members (14,15), which are placed on adjoining sides in the distribution piece (5) for fixing it on the one hand to the cylinder head (4) and on the other hand to the engine block (2).

2. An arrangement according to claim 1, wherein the distribution piece (5) constitutes a single piece of casting.

3. An arrangement according to claim 1, wherein the connection ports in the distribution piece (5) connectable to the cylinder head (4) are arranged at least substantially in the same uniform plane.

4. An arrangement according to claim 1, wherein the combustion air channel (11) and the exhaust gas channel (12) of the distribution piece (5) are arranged adjacent to each other in the longitudinal direction of the engine.

5. An arrangement according to claim 1, wherein; the exhaust gas channel (12) of the distribution piece (5) is arranged so that its inlet and outlet are located on opposite sides of the distribution piece (5).

6. An arrangement according to claim 1, wherein the outlet for the exhaust gas channel (12) of the distribution piece (5) is provided with a flange (16) or the like for supporting the exhaust pipe (7) through the distribution piece (5) to the engine block (2).

7. An arrangement according to claim 6, wherein the exhaust pipe (7) is surrounded with an isolating casing (8), which is also supported by means of the distribution piece (5) to the engine block (2).

8. An arrangement according to claim 1, wherein the engine block (2) includes an in-built or to the engine block separately fastened collecting container (6) for charged combustion air, the combustion air channel (11) of the distribution piece (5) being arranged to lead combustion air from the said collecting container (6) of the engine block (2) into the cylinder head (4).

9. An arrangement according to claim 1, wherein the engine block (2) includes a collecting channel (9) or the like for the collection of cooling water through the cylinder head (4) further to be recovered, the cooling water channel (13) of the distribution piece (5) being located at least partly around the exhaust gas channel (12) and its outlet being arranged to be connected to the said collecting channel (9) or the like located in the engine block (2).

* * * * *